United States Patent [19]

Bosnakovic

[11] 4,140,447
[45] Feb. 20, 1979

[54] PRESSURE FLUID CONNECTOR ASSEMBLY

[75] Inventor: Frederick Bosnakovic, Uniontown, Ohio

[73] Assignee: Vinton Industrial Corporation, Wadsworth, Ohio

[21] Appl. No.: 859,573

[22] Filed: Dec. 12, 1977

[51] Int. Cl.² .......................... B29H 5/02; B29H 5/18
[52] U.S. Cl. .......................................... 425/43; 425/53
[58] Field of Search ................... 425/29, 33, 35, 34 A, 425/34 R, 43, 44, 45, 49, 50, 51, 52, 53, 58

[56] References Cited

U.S. PATENT DOCUMENTS

| | | | |
|---|---|---|---|
| 1,109,048 | 9/1914 | Dees | 425/44 X |
| 1,393,998 | 10/1921 | Fulton | 425/43 X |
| 1,755,048 | 4/1930 | Brice | 425/53 |
| 1,791,060 | 2/1931 | Keen | 425/52 X |
| 1,818,536 | 8/1931 | Crossan et al. | 425/51 X |
| 1,893,762 | 1/1933 | De Mattia | 425/43 |
| 1,924,530 | 8/1933 | Woock | 425/53 |
| 1,982,674 | 12/1934 | Laursen | 425/58 |
| 2,035,861 | 3/1936 | Bury et al. | 425/29 X |
| 2,100,627 | 11/1937 | Bury et al. | 425/53 |
| 2,302,754 | 11/1942 | Eakin | 425/53 |
| 2,318,376 | 5/1943 | Crowley | 425/53 |
| 2,530,055 | 11/1950 | Green | 425/53 |
| 2,564,662 | 8/1951 | Baker | 425/53 |
| 2,670,499 | 3/1954 | Weigold et al. | 425/53 |
| 2,700,180 | 1/1955 | Mackay | 425/43 |

Primary Examiner—J. Howard Flint, Jr.
Attorney, Agent, or Firm—Mack D. Cook, II

[57] ABSTRACT

A pressure fluid connector assembly for a system to mold an article using heat transfer pressure fluid media supplied and exhausted through valved conduits. An article is formed in a mold cavity having an expansible pressure forming member with a media chamber. An assembly is positioned through a media chamber wall to provide concentric circulation during supply and exhaust of the media. An assembly has a nozzle body with a conical outer surface for frictional engagement with the surface of a coaxial bore of a resilient grommet adapted for mating engagement with and secure attachment to a media chamber wall. The nozzle body has a coaxial bore housing a core tube providing that media supply is transversely from the assembly and that media exhaust is coaxially within the assembly. An exhaust conduit extension having a remote intake end may be connected to the nozzle body.

6 Claims, 7 Drawing Figures

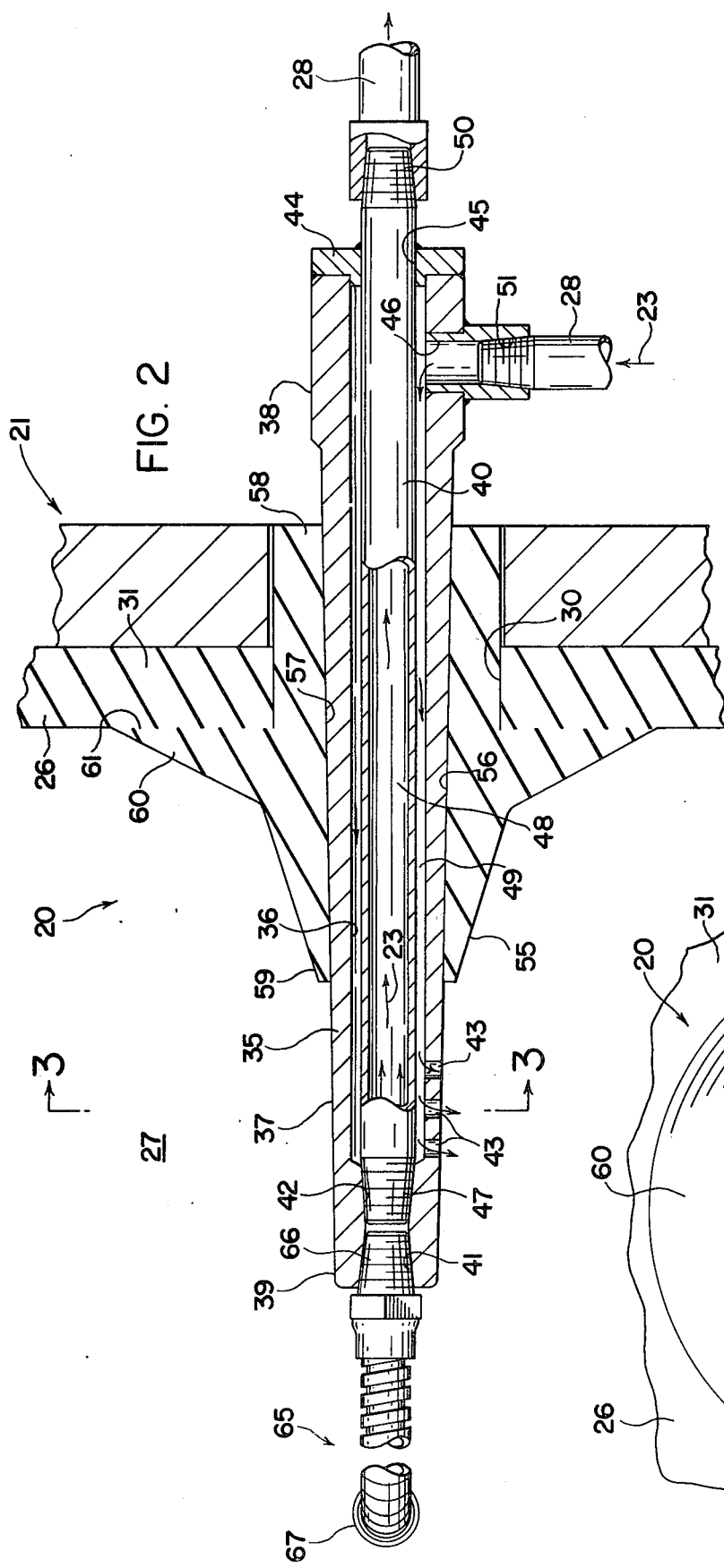
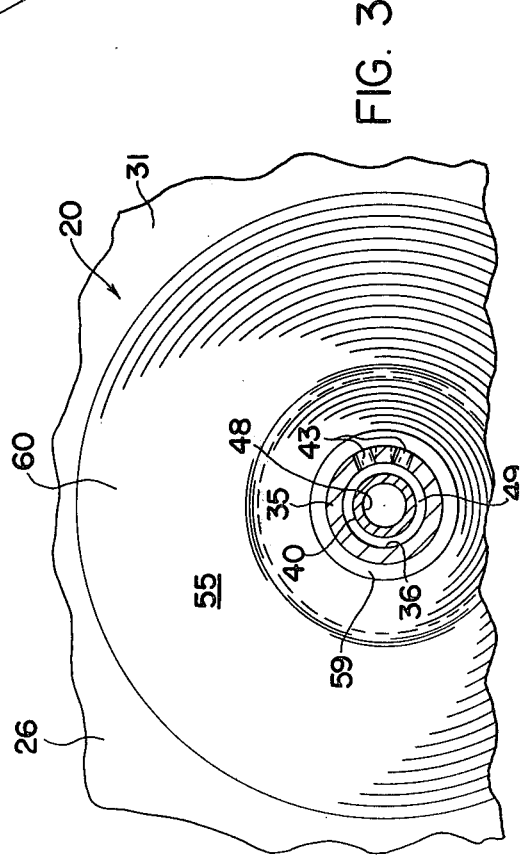

PRESSURE FLUID CONNECTOR ASSEMBLY

BACKGROUND OF THE INVENTION

The invention relates to a pressure fluid connector assembly for use in a system for molding an article using heat transfer pressure fluid media. A conventional or known system will include a mold cavity for the article as defined by confining outer matrices and an expansible inner pressure forming member. The pressure forming member has a media chamber to and from which quantities of the pressure fluid media are supplied and exhausted through conduits controlled by selectively actuated valves.

The field of art to which the invention pertains is understood to include Class 264/Subclass 315 and Class 425/Subclasses 44, 45, 47–53, 58, 137, 138, 156, 264 and 425, and other present and former (e.g., Class 18/Subclass 45) U.S. patent classifications pertaining to the curing or vulcanization of compounded or laminate structures containing plastic or rubber.

The invention may be used in a system for curing tires and other rubber articles using selectively supplied and exhausted pressure fluid media such as hot or cold water or steam. U.S. Reissue Pat. Re. No. 20,561 and U.S. Pat. No. 2,100,267, Nov./1937, Bucy et al, each speak to the problems of steam or water circulation in a curing bag for a tire mold. U.S. Pat. No. 2,302,754, Nov./1942, Eakin, discusses the problems encountered in piping arrangements for water bag and heater-type curing apparatus or systems including a fluid-expansible core or pressure forming member. U.S. Pat. No. 2,670,499, March/1954, Weigold et al, discloses a connecting and sealing means for introduction of fluid media under pressure into a curing bag.

Other U.S. patents generally disclosing tapered resilient seal plugs for pressure forming members or curing bags are No. 1,755,048, April/1930, Brice; No. 1,982,674, Dec./1934, Laursen; and No. 2,564,662, Aug./1951, Baker.

Still other U.S. patents relevant to controlling or improving circulation of a pressure fluid media include No. 1,791,060, Feb./1931, Keen; No. 1,924,530, Aug./1933, Woock; and No. 2,700,180, Jan./1955, Mackay.

The prior art, as represented by the above-enumerated U.S. patents and as otherwise known to the inventor, has had the disadvantage of restricted or poor circulation of the heat transfer pressure fluid media within the pressure forming member. In curing bags having a single stem, there will be a "dead-end" or non-circulating connection to the supply and exhaust conduits. The medium may be hot for the vulcanizing process or cold for the post-cure cycle. In either event, the non-circulating medium cannot transfer significant quantites of heat into or out of the curing bag. It has also been known to provide a curing bag with stems or connecting nipples 180° apart (in plan), assuming that the medium would divide equally and uniformly on each side of the media chamber or internal cavity of the curing bag, thereby improving heat transfer.

The present invention provides a pressure fluid connector assembly with transverse media supply and coaxial media exhaust providing an even, uniform, or concentric circulation or flow path through the media chamber of the pressure forming member. The circulation will be 360° around the media chamber providing for relatively uniform heat transfer to and from the article being molded.

The present invention also provides a pressure fluid connector assembly having a nozzle body which may be readily disconnected from the pressure forming member for replacement or maintenance.

SUMMARY OF THE INVENTION

It is an object of the invention to provide an improved pressure fluid connector assembly for use in a system for molding an article using heat transfer pressure fluid media.

It is a further object to provide an improved pressure fluid connector assembly for use in a system including a mold cavity for an article and defined by confining outer matrices and an expansible inner pressure forming member having a media chamber to and from which quantities of pressure fluid media are supplied and exhausted through conduits controlled by selectively actuated valves.

Still further, it is an object to provide an improved pressure fluid connector assembly with transverse media supply and coaxial media exhaust providing an even, uniform, or concentric circulation or flow path through the media chamber of a pressure forming member and relatively uniform heat transfer to and from the article being molded.

Still further, it is an object to provide a connector assembly having a nozzle body which may be readily disconnected from a pressure forming member for replacement or maintenance.

These and other objects of the invention, as well as the advantages thereof, will be apparent in view of the detailed description of the embodiments thereof as set forth below.

In general, a pressure fluid connector assembly according to the invention is positioned through an opening in a wall of the media chamber of a pressure forming member and into the forming member.

The connector assembly has a nozzle body with a varied diameter coaxial bore and an outer surface gradually tapered from an outer end toward an inner end and a core tube positioned coaxially within the bore. A portion of the bore adjacent the inner end of the nozzle body is of reduced diameter. A portion of the nozzle body adjacent the reduced diameter bore portion has a series of closely spaced inner transverse or generally radially directed bores therethrough. The outer end of the nozzle body carries a closure cap having a coaxial bore therethrough. A portion of the nozzle body adjacent the closure cap has an outer transverse or generally radially directed bore therethrough. The inner end of the core tube is seated at the reduced diameter bore portion and the outer end of the core tube is seated within the closure cap bore to provide an axial conduit extending through the nozzle body for exhaust of pressure fluid media from within the media chamber. These seatings of the ends of the core tube further provide a coaxial chamber extending through the nozzle body from the closure cap to the reduced diameter bore portion for supply of pressure fluid media into the media chamber through the series of inner transverse bores. The outer end of the core tube is adapted for connection to a conduit controlled for the exhaust of fluid pressure media. The nozzle body outer transverse bore is adapted for connection to a conduit controlled for the supply of pressure fluid media.

The connector assembly further includes a resilient grommet to be attached within the opening in a wall of the media chamber. The resilient grommet has a coaxial bore for defining a functional opening in the media chamber wall and having a surface gradually tapered from an outer end toward an inner end for full surface mating and frictional engagement with the outer surface of the nozzle body. The longitudinal extent of the grommet bore is less than the distance between the inner and outer transverse bores of the nozzle body. The resilient grommet also has a medial flange portion between the outer and inner end thereof. The medial flange portion has an axially outer surface for mating engagement with, and having an area for secure attachment to, a wall of the media chamber surrounding the opening therein.

When the opening is in a wall of the media chamber which is substantially vertically oriented, the connector assembly may also include an exhaust conduit extension having a discharge end adapted for connection to the inner end of the nozzle body in communication with the axial conduit defined by the core tube and extending through the nozzle body. The preferably flexible conduit extension has a length such that the intake end thereof will normally be located adjacent a bottom substantially horizontally oriented wall of the media chamber.

IN THE DRAWINGS

FIG. 2 is an assembled longitudinal cross-section of the embodiment of FIG. 1, as positioned through an opening in a wall of the media chamber of a pressure forming member and into the forming member;

FIG. 3 is a fragmentary end view, taken substantially as indicated on line 3—3 of FIG. 2;

Figure 7:
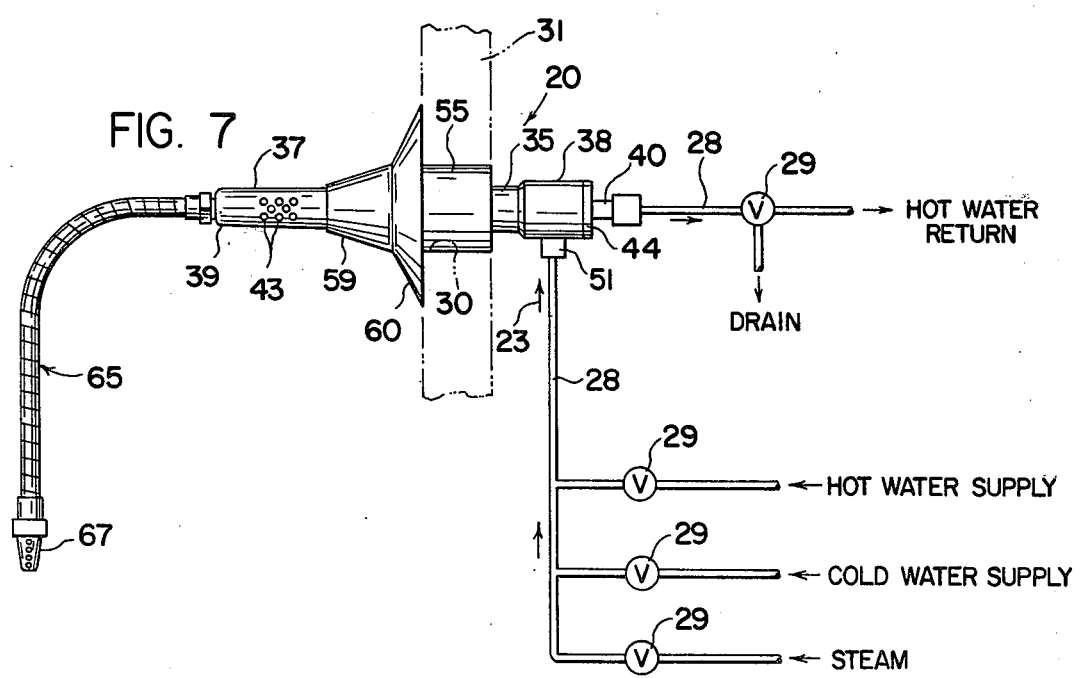
Figure 5:
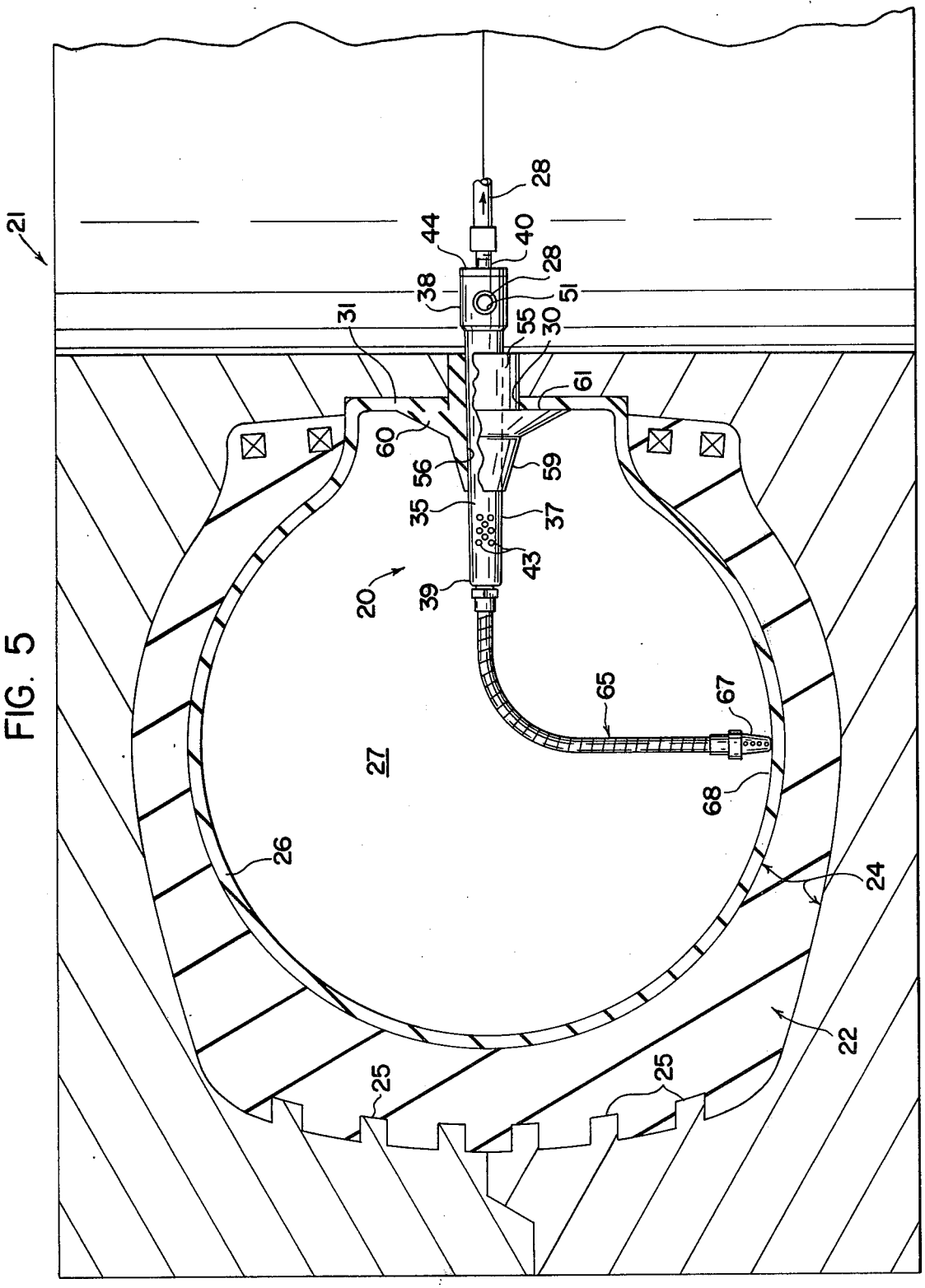
FIG. 5 is an enlarged cross-sectional view, taken substantially as indicated on line 5—5 of FIG. 4.
Figure 6:
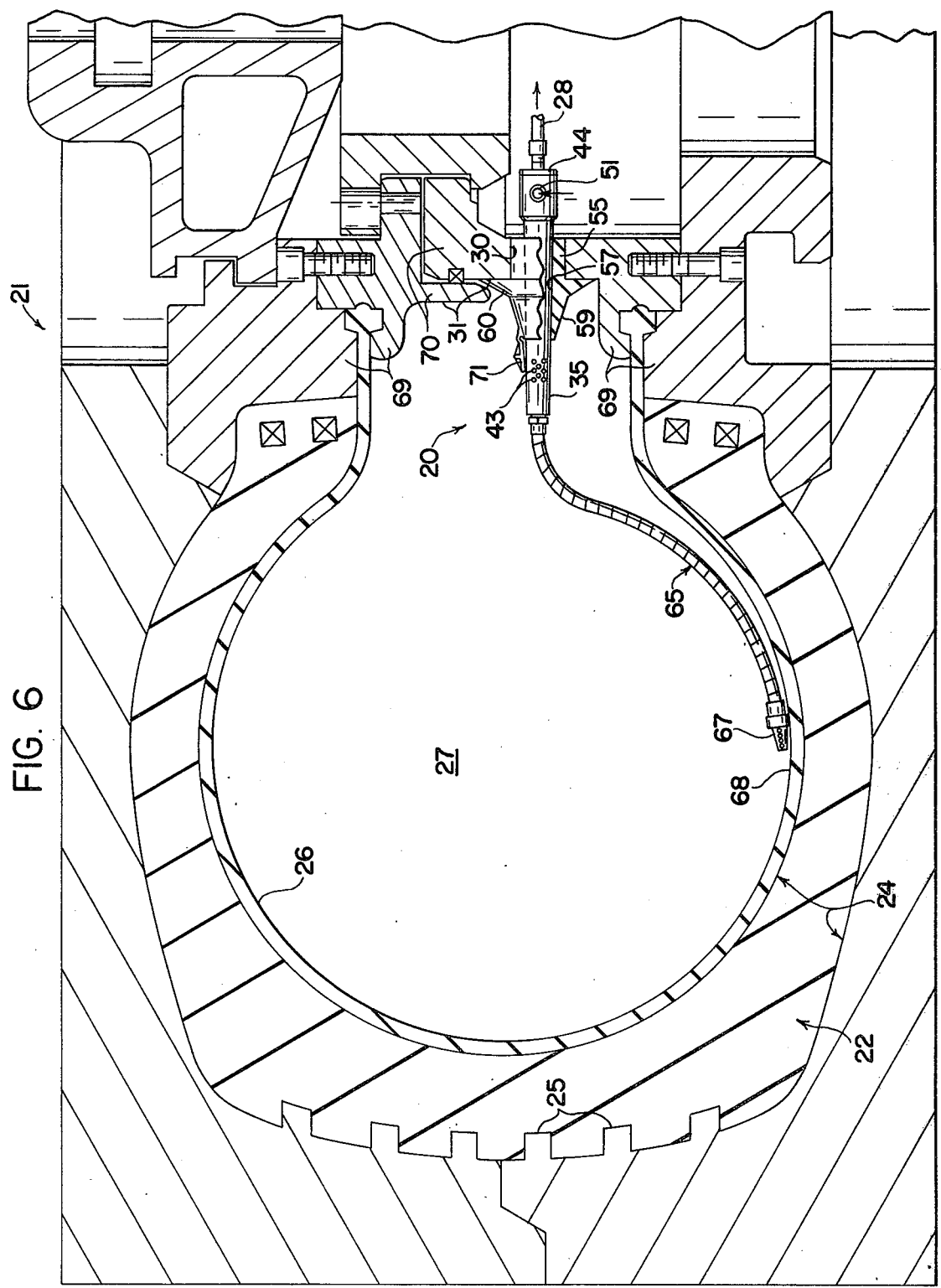

FIG. 6 is a view, similar to FIG. 5, showing an alternative embodiment of a pressure fluid connector assembly according to the invention used in a system wherein the pressure forming member is an expansible cylindrical bag or diaphragm; and, FIG. 7 is a simple schematic showing of suitable pressure fluid media valved conduits for connection to a pressure fluid connector assembly according to the invention.

DETAILED DESCRIPTION OF THE INVENTION

The pressure fluid connector assembly, referred to generally by the numeral 20, is for use in a conventional system using heat transfer pressure fluid media supplied and exhausted through valved conduits. The system, referred to generally by the numeral 21, is used to mold, cure, or vulcanize an article, referred to generally by the numeral 22. When the article 22 is a vehicle tire, the heat transfer pressure fluid media, referred to generally by the numeral 23, may be hot or cold water or steam.

Referring to FIGS. 5 and 6, the article 22 is formed in a mold cavity, referred to generally by the numeral 24. The mold cavity 24 is defined by confining outer matrices or patterned surfaces 25 and an expansible inner pressure forming member, bag, or diaphragm 26. The pressure forming member 26 has a media chamber 27 to and from which quantities of pressure fluid media 23 are supplied and exhausted. The pressure fluid media 23 is supplied and exhausted through any suitable or desired series of conduits, referred to generally by the numeral 28. Referring also to FIG. 7, flow of pressure fluid media 23 through the conduits 28 is controlled by any desired series of selectively actuated valves, referred to generally by the numeral 29.

The connector assembly 20 is intended to be positioned through a preformed opening 30 in a wall 31 of a media chamber 27 and into a pressure forming member 26 for selective supply and exhaust of pressure fluid media 23 through the conduits 28 as controlled by valves 29.

Figure 1:
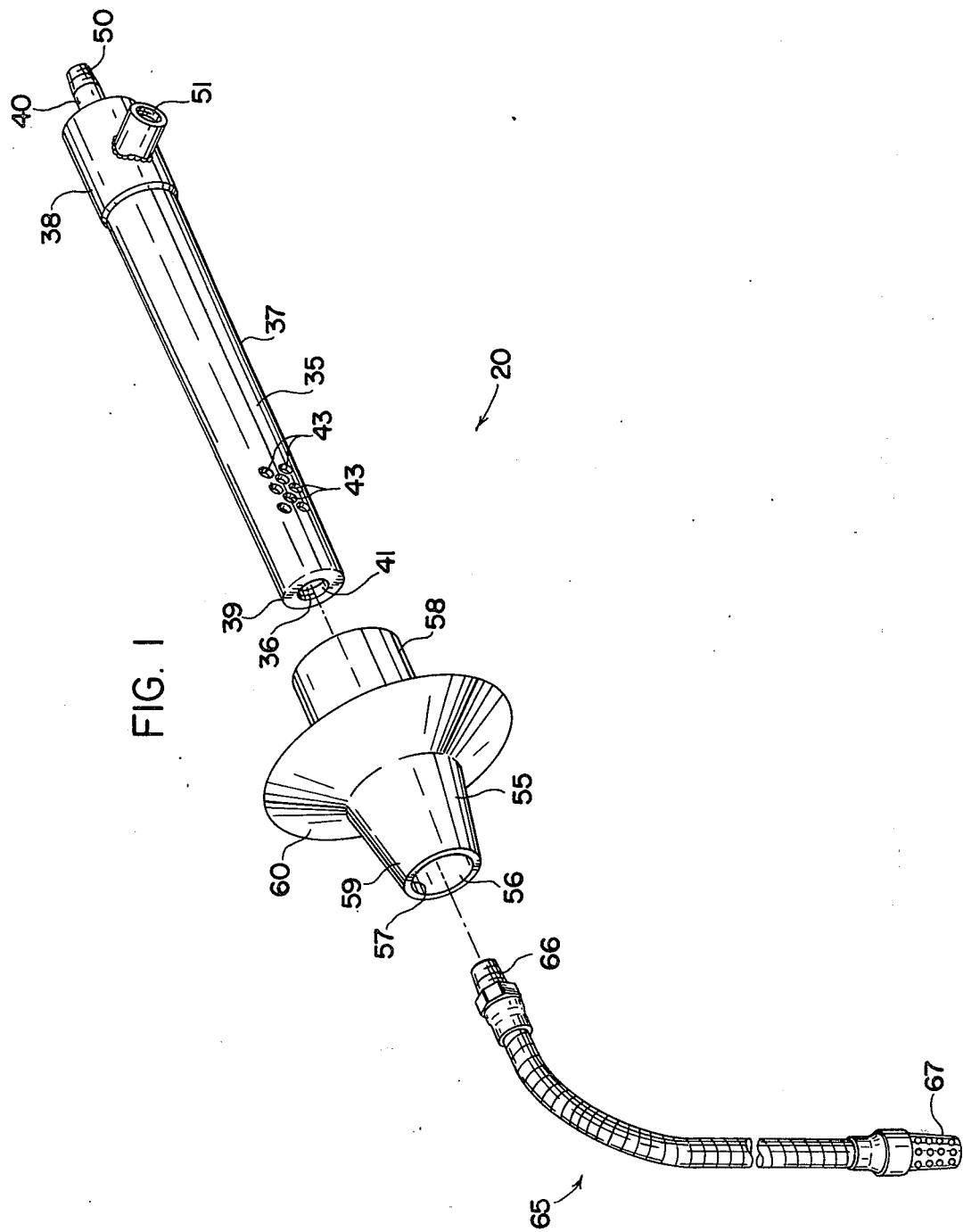
FIG. 1 is an exploded perspective view of a preferred embodiment of a pressure fluid connector assembly according to the invention.

As best shown in FIGS. 1 and 2, the primary axial component of a connector assembly 20 is a nozzle body 35 with a varied diameter coaxial bore 36 extending longitudinally therethrough. The body 35 has a conical outer surface 37 gradually tapered from an outer end 38 toward an inner end 39. As shown, the taper of surface 37 may be approximately 2° (two degrees). A core tube 40 is positioned coaxially with the bore 36.

Referring to FIG. 2, a portion of the bore 36 adjacent the inner end 39 of the nozzle body 35 is of reduced diameter having two sets of outer and inner internal threads, as indicated at 41 and 42. A portion of the body 35 adjacent the reduced diameter bore portion and inner threads 42 has a series of closely spaced relatively small diameter inner transverse or generally radially directed bores 43 therethrough. The outer end 38 of the body 35 carries a closure cap 44, secured thereto as by welding or brazing for closing the coaxial bore 36. The closure cap 44 has a smaller diameter coaxial bore 45 therethrough, with an inner diameter coincident with the outer diameter of a core tube 40. A portion of the body 35 adjacent the closure cap 44 has a relatively large diameter outer transverse or generally radially directed bore 46 therethrough.

The inner end of the core tube 40 is seated and fluid pressure sealed at the reduced diameter portion of the bore 36 as by external threads 47 for mating engagement with the inner bore threads 42. The outer end of the tube 40 is suitably seated and fluid pressure sealed within the closure cap bore 45. These seatings of the ends of a core tube 40 provide an axial conduit, indicated at 48, extending through the nozzle body 35 for exhaust of pressure fluid media 23 from within media chamber 27. These seatings of the ends of a core tube 40 also provide a coaxial chamber, indicated at 49, extending through the body 35 from the closure cap 44 to the reduced diameter portion of the bore 36 for supply of pressure fluid media into the media chamber 27 through the series of inner transverse bores 43.

As shown, the outer end of the core tube 40 is adapted, as by external threads 50, for suitable connection to a conduit 28 controlled, as by a valve 29, for the exhaust of pressure fluid media 23. The nozzle body outer transverse bore 46 is adapted, as by internal threads 51, for suitable connection to a conduit 28 controlled, as by a valve 29, for supply of pressure fluid media 23.

The pressure fluid connector assembly 20 also has a resilient grommet 55 intended to be attached within the opening 30 in a wall 31 of a media chamber 27.

The resilient grommet 55 has a coaxial bore 56 extending longitudinally therethrough and defining a functional opening in a wall 31 of a media chamber 27. The bore 56 has a conical surface 57 gradually tapered from an outer end 58 toward an inner end 59. The inner diameter of a bore surface 57 is coincident with the outer diameter of a nozzle body surface 37, for full surface mating and frictional engagement therewith. The longitudinal extent of the grommet bore 56 and surface 57 is less than the distance between the inner and outer transverse bores 43 and 46 through the nozzle body 35.

The resilient grommet 55 also has a medial flange portion 60 between the outer and inner end portions 58 and 59. The flange portion 60 has an axially outer surface 61 for mating engagement with, and having an area sufficient for secure attachment to, as by vulcanization or a suitable adhesive, the wall 31 of the media chamber 27 surrounding the opening 30 therein.

The pressure fluid connector assembly 20 may also have a conduit extension, referred to generally by the numeral 65, to suitably lengthen the exhaust path provided by the axial conduit 48 extending through the nozzle body 35. As shown, the extension 65 may be a flexible or reinforced hose having a discharge end with external threads 66 for mating engagement with the outer bore threads 41 and communication with the core tube axial conduit 48. The length of an extension 65 may be suitably chosen. As shown in FIGS. 5 and 6, when the opening 30 is in a wall 31 of a media chamber 27 which is substantially vertically oriented, the length of an extension 65 may be such that the intake end 67 will be located adjacent a bottom substantially horizontally oriented wall 68 of the media chamber 27.

Figure 4:
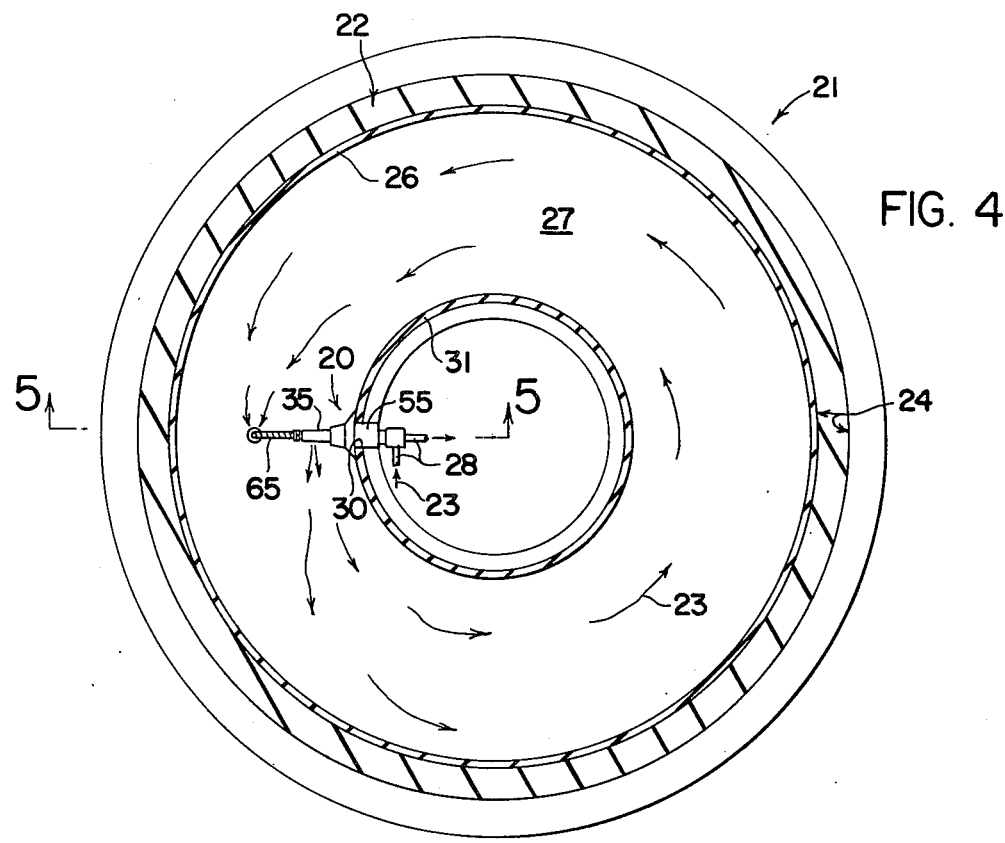
FIG. 4 is a schematic sectional plan view showing a pressure fluid connector assembly according to the invention used in a system wherein the pressure forming member is an expansible annular or toroidal curing bag.

FIGS. 4 and 5 show the use of a pressure fluid connector assembly 20 in a system 21 wherein the article 22 is a vehicle tire and the pressure forming member 26 is an expansible annular or toroidal curing bag. In this environment, the non-rigid wall portion 31 is preferably prefabricated with the resilient grommet 55 of an assembly 20 integrally attached thereto around an opening 30. For operation of such a system 21, the nozzle body 35 of an assembly 20 may be readily inserted into the grommet bore 56 to provide the connections to the conduits 28. When pressure fluid media 23 is supplied to the media chamber 27, the resultant pressure exerted on the grommet inner end 59 and flange portions 60 during expansion of the bag 26 will assure a hydrostatic or high-pressure seal between the nozzle body surface 37 and the grommet bore surface 57. When the pressure of the fluid media 23 is exhausted from the media chamber 27, the nozzle body 35 may be readily withdrawn from the grommet bore 56.

FIG. 6 shows the use of a pressure fluid connector assembly 20 in a system 21 wherein the article 22 is a vehicle tire and the pressure forming member 26 is an expansible cylindrical bag or diaphragm. In this environment, the ends of the bag 26 are closed by sets of relatively movable clamp rings 69 to define the media chamber 27. The opposed axially inner element of the clamp rings may carry thereon cooperating annular ring elements 70 which will define a rigid wall portion 31 with a predrilled opening 30 therethrough. The resilient grommet 55 of an assembly 20 may be suitably positioned relative to and around an opening 30.

When the operation of the system 21 as shown in FIG. 6 is preceded by a conventional "shaping operation", whereby the annular rings 70 are moved axially one toward the other and the cylindrical bag 26 is radially distended to shape the tire 22 into generally toroidal form, the nozzle body 35 of an assembly 20 will preferably not be inserted into the grommet bore 56. During such a "shaping operation", there may be an interval of time wherein a relatively low fluid pressure is applied within the media chamber 27 to maintain the generally toroidal form of the tire 22 prior to cure. To maintain such an applied pressure prior to insertion of the nozzle body 35 into the grommet bore 56, the outer end 59 of the grommet 55 may have associated therewith a flap or seal structure 71 for momentary closing of the bore 56. After the composite structure of tire 22, diaphragm 26, rigid wall 31, and annular rings 70 is positioned between the matrices 25, as in FIG. 6, the nozzle body 35 may be readily inserted into the grommet bore 56, raising the flap 71 and opening the pressure gate defined thereby, to provide the connections to the conduits 28. When pressure fluid media 23 is supplied to the media chamber 27, the resultant pressure exerted on the grommet inner end 59 and flange portions 60 during expansion of the diaphragm 26 will assure a hydrostatic or high-pressure seal between the nozzle body surface 37 and the grommet bore surface 57. When the pressure of the fluid media 23 is exhausted from the media chamber 27, the nozzle body 35 may be readily withdrawn from the grommet bore 56.

In both environments of a system 21 as shown, as well as in other operating environments which will occur to those skilled in the art, it is apparent that a pressure fluid connector assembly 20 will significantly contribute to the operational efficiencies of a system 21. The supply or input of fluid media 23 into a media chamber 27 transversely or radially of the nozzle body 35, from the series of inner transverse bores 43, and the exhaust or discharge of fluid media 23 coaxially within the assembly 20, through the conduit 48, will provide an even, uniform, or concentric circulation or flow path through the media chamber 27 of an expansible pressure forming member 26 and relatively uniform heat transfer to and from the article 22 being molded in the cavity 24.

I claim:

1. A pressure fluid connector assembly for use in a system for molding an article using heat transfer pressure fluid media, said system including a mold cavity for said article defined by confining outer matrices and an expansible inner pressure forming member, said forming member having a media chamber to and from which quantities of said pressure fluid media are supplied and exhausted through conduits controlled by selectively actuated valves, said connector assembly to be positioned through an opening in the wall of said media chamber and into said pressure forming member, said connector assembly comprising:
a nozzle body having a varied diameter coaxial bore and an outer surface gradually tapered from an outer end toward an inner end and a core tube positioned coaxially within said bore;
a portion of said bore adjacent the inner end of said nozzle body being of reduced diameter, a portion of said nozzle body adjacent said reduced diameter bore portion having a series of closely spaced inner transverse bores therethrough, the outer end of said nozzle body carrying a closure cap having a coaxial bore therethrough, and a portion of said nozzle body adjacent said closure cap having an outer transverse bore therethrough;

the inner end of said core tube being seated at said reduced diameter bore portion and the outer end of said core tube being seated within said closure cap bore to provide an axial conduit extending through said nozzle body for exhaust of said pressure fluid media from within said media chamber and to further provide a coaxial chamber extending through said nozzle body from said closure cap to said reduced diameter bore portion for supply of said pressure fluid media into said media chamber through said series of inner transverse bores;

said outer end of said core tube being adapted for connection to a conduit controlled for said exhaust of pressure fluid media, and said nozzle body outer transverse bore being adapted for connection to a conduit controlled for said supply of pressure fluid media;

said connector assembly further comprising:

a resilient grommet to be attached within said opening in said media chamber wall and having a coaxial bore with a surface gradually tapered from an outer end toward an inner end for mating engagement with said nozzle body outer surface, the longitudinal extent of said grommet bore being less than the distance between said inner and outer transverse bores of said nozzle body;

said resilient grommet further having a medial flange portion between said outer and inner ends, said medial flange portion having an axially outer surface for mating engagement with, and having an area for secure attachment to, said media chamber wall surrounding said opening therein.

2. A pressure fluid connector assembly according to claim 1, wherein said pressure forming member is an expansible annular curing bag and said media chamber wall surrounding said opening therein is non-rigid.

3. A pressure fluid connector assembly according to claim 1, wherein said pressure forming member is an expansible cylindrical bag having ends closed by relatively movable clamp rings and said media chamber wall surrounding said opening therein is rigid.

4. A pressure fluid connector assembly according to claim 1 for use in a system wherein said media chamber wall surrounding said opening therein is substantially vertically oriented, and further comprising:

a conduit extension having a discharge end adapted for connection to said inner end of said nozzle body in communication with said axial conduit extending through said nozzle body.

5. A pressure fluid connector assembly according to claim 4, wherein said conduit extension is flexible and has a length such that the intake end thereof will be normally located adjacent a bottom substantially oriented wall of said media chamber.

6. A nozzle body for a fluid pressure connector assembly for use in a system for molding an article using heat transfer pressure fluid media, said system including a mold cavity for said article defined by confining outer matrices and an expansible inner pressure forming member, said forming member having a media chamber to and from which quantities of said pressure fluid media are supplied and exhausted through conduits controlled by selectively actuated valves, said media chamber having a wall with a functional opening therein defined by the coaxial bore of a resilient grommet attached to said wall, said coaxial bore having a surface gradually tapered from an outer end toward an inner end;

said nozzle body having a varied diameter coaxial bore and an outer surface gradually tapered from an outer end toward an inner end and a core tube positioned coaxially within said bore;

a portion of said bore adjacent the inner end of said nozzle body being of reduced diameter, a portion of said nozzle body adjacent said reduced diameter bore portion having a series of closely spaced inner transverse bores therethrough, the outer end of said nozzle body carrying a closure cap having a coaxial bore therethrough, and a portion of said nozzle body adjacent said closure cap having an outer transverse bore therethrough;

the inner end of said core tube being seated at said reduced diameter bore portion and the outer end of said core tube being seated within said closure cap bore to provide an axial conduit extending through said nozzle body for exhaust of said pressure fluid media from within said media chamber and to further provide a coaxial chamber extending through said nozzle body from said closure cap to said reduced diameter bore portion for supply of said pressure fluid media into said media chamber through said series of inner transverse bores;

said outer end of said core tube being adapted for connection to a conduit controlled for said exhaust of pressure fluid media, and said nozzle body outer transverse bore being adapted for connection to a conduit controlled for said supply of pressure fluid media, when said nozzle body outer surface is in mating engagement with said functional opening in said media chamber wall.

* * * * *